United States Patent [19]
Aboaf et al.

[11] Patent Number: 5,652,015
[45] Date of Patent: Jul. 29, 1997

[54] PROCESS FOR FABRICATING AN ARBITRARY PATTERN WRITE HEAD

[75] Inventors: Joseph Adam Aboaf; Edward Virgil Dennison; Jules David Friedman; Vincent Noel Kahwaty; Herman Carl Kluge, all of Tucson, Ariz.

[73] Assignee: International Business Machines Corporation, Armonk, N.Y.

[21] Appl. No.: 685,996

[22] Filed: Jul. 25, 1996

Related U.S. Application Data

[62] Division of Ser. No. 341,792, Nov. 17, 1994, Pat. No. 5,572,392.

[51] Int. Cl.$^6$ .................................................. B05D 5/12
[52] U.S. Cl. .................. 427/116; 427/125; 427/126.6; 427/127; 427/128; 427/130; 427/131; 427/132; 427/264; 427/265; 427/270; 427/271; 427/331; 427/404; 427/419.2
[58] Field of Search ..................... 427/116, 125, 427/126.6, 127, 128, 130, 131, 132, 264, 265, 270, 271, 331, 404, 419.2

[56] References Cited

U.S. PATENT DOCUMENTS

| | | | |
|---|---|---|---|
| 4,481,071 | 11/1984 | Anderson et al. | 156/656 |
| 4,878,290 | 11/1989 | Masud et al. | 29/603 |
| 4,939,835 | 7/1990 | Coutellier et al. | 29/603 |
| 4,939,836 | 7/1990 | Meunier et al. | 29/603 |
| 4,992,901 | 2/1991 | Keel et al. | 360/110 |
| 5,013,394 | 5/1991 | Rolland et al. | 156/627 |
| 5,042,140 | 8/1991 | Coutellier et al. | 29/603 |
| 5,062,196 | 11/1991 | Dourex-Dauphin | 29/603 |
| 5,067,230 | 11/1991 | Meunier et al. | 29/603 |
| 5,086,362 | 2/1992 | Maurice | 360/121 |
| 5,093,980 | 3/1992 | Maurice et al. | 29/603 |
| 5,123,156 | 6/1992 | Meunier et al. | 29/603 |
| 5,167,062 | 12/1992 | Castera et al. | 29/603 |
| 5,224,260 | 7/1993 | Fedeli et al. | 29/603 |
| 5,296,993 | 3/1994 | Aboaf et al. | 360/126 |

*Primary Examiner*—Bernard Pianalto
*Attorney, Agent, or Firm*—Benman Collins & Sawyer

[57] ABSTRACT

An arbitrary pattern write head assembly for writing timing-based servo patterns on magnetic storage media is provided, comprising: (a) a first pole piece comprising a substrate comprising a magnetic material, said substrate having a major surface; (b) a plurality of electrically conducting windings formed on the major surface; and (c) a second pole piece formed on the substrate, with a portion thereof formed above the plurality of electrically conducting windings and electrically insulated therefrom, the second pole piece having at least one opening therethrough defining a gap above the electrically conducting windings and the substrate, the second pole piece comprising at least two layers, each layer comprising a magnetic material. A method of batch fabricating servo writer heads is also provided for batch fabrication of servo writer heads at a very low cost. The method enables fabrication of heads capable of azimuthal recording commonly practiced in the video recording art. Hard nitrided Fe/NiFe poletip materials are used to minimize wear in tape head use.

19 Claims, 5 Drawing Sheets

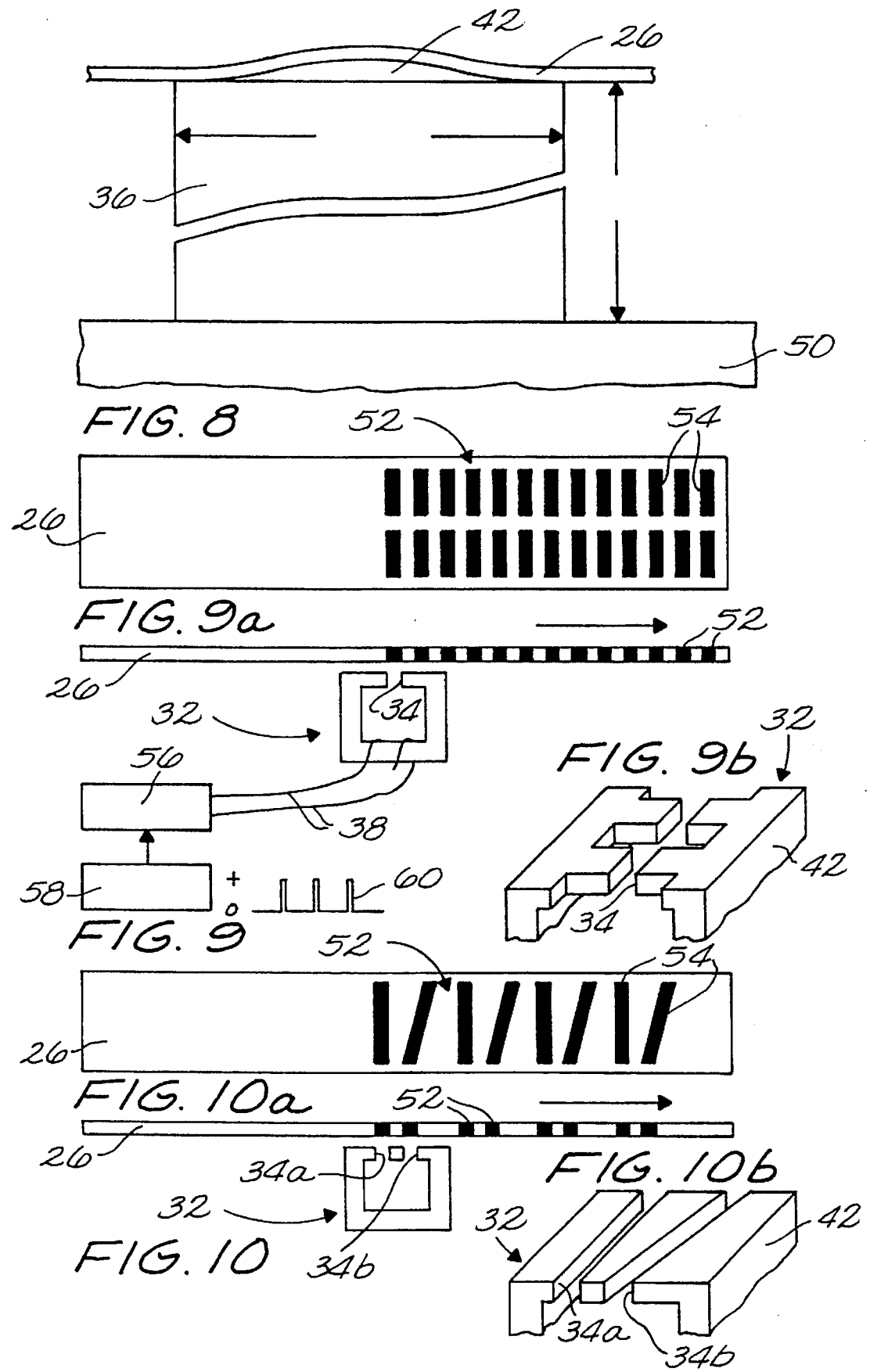

PROCESS FOR FABRICATING AN ARBITRARY PATTERN WRITE HEAD

This is a divisional of application Ser. No. 08/341,792 filed on Nov. 17, 1994 now U.S. Pat. No. 5,572,392.

TECHNICAL FIELD

The present invention relates generally to recording and reading data from magnetic storage media and, more particularly, to an improved magnetic write head design for writing timing-based servo patterns on magnetic storage media.

BACKGROUND ART

Conventional magnetic write heads used for both disk and tape applications use a single gap to define the shape of written transitions. This geometry is fine for data writing, but is not suitable for writing more complex magnetic patterns such as are necessary for servoing or for tape head module calibration.

Calibration of the position and widths of various read and write elements which comprise a tape head module is necessary to reduce track misregistration errors and therefore increase data density. This calibration may be accomplished by passing the head module over a tape written with a precisely dimensioned pattern. The relative position and absolute widths of the various read elements may be determined by scanning the module laterally across the tape while measuring the signal amplitudes from the various elements. These amplitudes can be used to locate the edges of the read elements. Likewise, write heads can be calibrated by writing a pattern with them and then locating the tracks with previously calibrated read heads. Having servo tracks on the tape can simplify the process of measuring the absolute position of the head module as it scans across the tape.

Servo patterns require a somewhat different structure. They must have some feature which changes across the width of a track. In two-frequency servo schemes, a pattern is written with one frequency on the left side of the track and a different frequency on the right side of the track. As a read head passes over this pattern, its lateral position can be determined by the relative strengths of the two signals. More complex phase-detection schemes are also used. These schemes require that diagonal tracks be written across several tracks. In both cases, these patterns are normally written with multiple passes of a conventional write head. Clearly, the resulting pattern is limited by the write head geometry and the accuracy with which the head can be repeatedly run over adjacent regions of the media.

A timing-based servo scheme has been developed which offers several advantages over more conventional approaches. The idea is to have a servo pattern on the tape which continuously varies from one edge of the servo track to the other. This pattern is then read by a narrow read head which samples the servo information at essentially a single point across the width of the track. The relative timing between successive transitions read by the read head indicates the lateral position of the head. The advantages of this approach are: decreased sensitivity to microtrack profile variations in the read head, improved detection of read errors which can produce erroneous position error signals (PES), and improved linearity of PES signals across the servo track.

A track-following servo control system in a magnetic media storage device is disclosed in application Ser. No. 08/270,207, filed Jun. 30, 1994, and assigned to the same assignee as the present application. The system derives head position information from one or more specially patterned servo tracks. Servo patterns on a tape storage media are generated using a multiple gap servo write head. The gaps of the head contain geometries appropriate to generate desired servo pattern features. The patterned gaps of the head are produced by photolithographically defined plating of permalloy material on a ferrite ring head structure. Pulses of current through the windings of the write head transfer the geometric pattern of the gaps on the head to identical magnetization patterns on the tape. Appropriate timing of the pulses generates the desired pattern sequences. However, this approach requires individual head processing on a previously contoured surface, which is a costly solution.

A number of magnetic write heads are known; see, e.g., U.S. Pat. Nos. 5,296,993; 5,224,260; 5,167,062; 5,123,156; 5,093,980; 5,086,362; 5,067,230; 5,042,140; 5,013,394; 4,939,836; and 4,939,835. However, the magnetic write heads all suffer from one or more disadvantages for the specific application described above. For example, while U.S. Pat. No. 5,296,993 is adequate for its intended purpose, it is capable of only writing flat, and cannot write overlapped patterns. Many of the references are not directed to thin film heads, which are required by the above-mentioned patent application, including U.S. Pat. Nos. 4,939,835; 4,939,836; 5,042,140; and 5,067,230. Others are directed to a mechanically-formed device, including U.S. Pat. Nos. 5,013,394; 5,093,980; 5,123,156; and 5,167,062. The remaining references (U.S. Pat. Nos. 5,086,362 and 5,224,260) employ fabrication processes that are costly.

Thus, a magnetic write head is required that is capable of batch fabrication, employs thin film processing methods, and avoids costly fabrication procedures, yet is useful for the above-described purpose.

DISCLOSURE OF INVENTION

In accordance with the invention, an arbitrary pattern write head assembly for writing timing-based servo patterns on magnetic storage media is provided, comprising:

(a) a first pole piece comprising a substrate comprising a magnetic material, said substrate having a major surface;

(b) a plurality of electrically conducting windings formed on the major surface; and (c) a second pole piece formed on the substrate, with a portion thereof formed above the plurality of electrically conducting windings and electrically insulated therefrom, the second pole piece having at least one opening therethrough defining a gap above the electrically conducting windings and the substrate, the second pole piece comprising at least two layers, each layer comprising a magnetic material.

Further in accordance with the present invention, a method of fabricating servo writer heads is provided. The method comprises:

(a) providing a first pole piece comprising a substrate comprising a magnetic material;

(b) forming on the substrate an electrically conducting film defining a coil pattern; and (c) forming at least two layers of a second pole piece magnetic material above the electrically conducting film and insulated therefrom, thereby defining at least a first deposited layer and a last deposited layer, each layer having an opening defining a gap over the substrate, the last deposited layer having a smaller gap than an underlying layer.

The method of the present invention permits batch fabrication of servo writer heads at a very low cost. Another advantage of the present invention is the ability to fabricate heads capable of azimuthal recording commonly practiced in the video recording art. When used in a tape head, wear may be minimized by using hard nitrided Fe/NiFe as the pole piece materials. The pole piece materials can be made as multiple layers of iron (thickness up to 0.2 micrometers each) and permalloy (thickness less than 0.03 micrometers each), or multiple layers of iron (thickness up to 0.2 micrometers each), and insulator material (thickness less than 0.03 micrometers each). These film layers deposited in a high nitrogen atmosphere lead to high magnetization wear-resistant magnetic materials.

BRIEF DESCRIPTION OF THE DRAWINGS

FIG. 8 is a side elevational view, showing the relationship of the magnetic write head of the invention to magnetic tape;

FIG. 9 is a schematic representation of a recording system, in side elevation, for producing a magnetic tape, using a multiple gap head formed by the process of the present invention;

FIG. 9a is a top plan view of the magnetic tape and the magnetic pattern produced therein by the multiple gap head shown in FIG. 9b.

FIG. 9b is a perspective view of a multiple gap head which produces the magnetic patterns shown in FIGS. 9 and 9a;

FIG. 10 is a view similar to that of FIG. 9, but eliminating non-essential elements for clarity;

FIG. 10a is a view similar to that of FIG. 9a, but showing the resulting magnetic pattern on the magnetic tape resulting from the use of the multiple gap head shown in FIG. 10b; and FIG. 10b is a view similar to that of FIG. 9b, but showing a different multiple gap head for producing the magnetic patterns shown in FIGS. 10 and 10a.

BEST MODES FOR CARRYING OUT THE INVENTION

Figure 1:
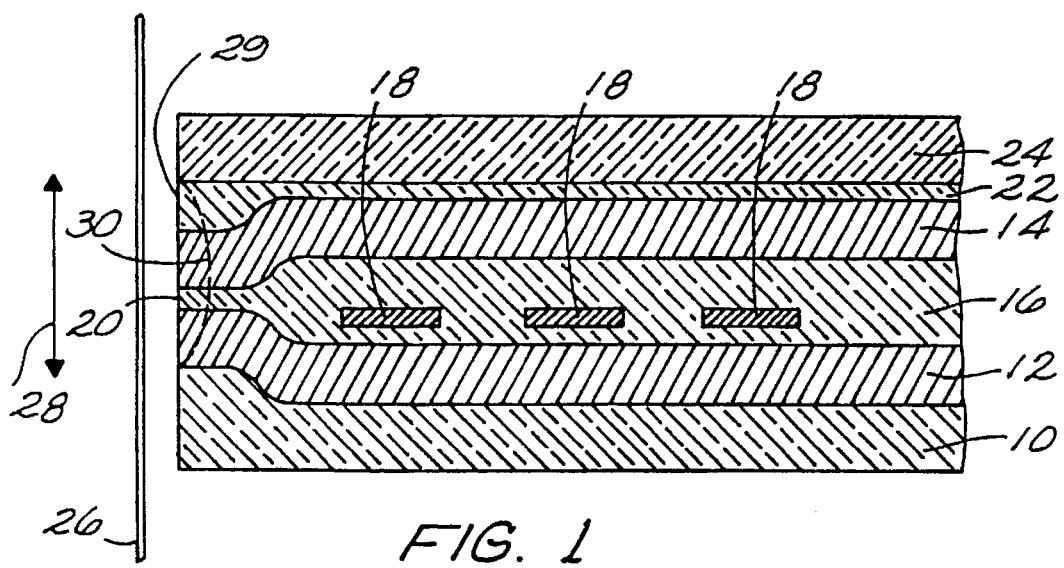
FIG. 1 is a cross-sectional view of a prior art thin film recording magnetic head.

FIG. 1 shows a typical conventional thin film magnetic head for use in contact recording on flexible magnetic media, such as magnetic tape. The prior art thin film magnetic head includes a non-magnetic substrate 10, generally made of a non-magnetic ceramic. A first thin film pole piece 12, generally made of a Permalloy, that is, a nickel-iron material, is deposited onto the substrate 10. A second thin film pole piece 14 of the same nickel-iron material is deposited onto an insulating layer 16 which encompasses the coil conductors 18 and forms a magnetic gap 20. A support and leveling material 22, generally non-magnetic, is deposited onto the second pole piece 14. The support material 22 is then covered by a non-magnetic closure piece 24. A magnetic tape media 26 moves in a direction as shown by arrow 28 operating in a motion transverse to the pole pieces 12 and 14 over a bearing surface 29 where the contact recording takes place. A likely gap erosion profile on the bearing surface of the conventional thin film recording head after wear as a result of the magnetic tape coming in contact at the bearing surface 29 is depicted by the dashed line 30.

Figure 2:
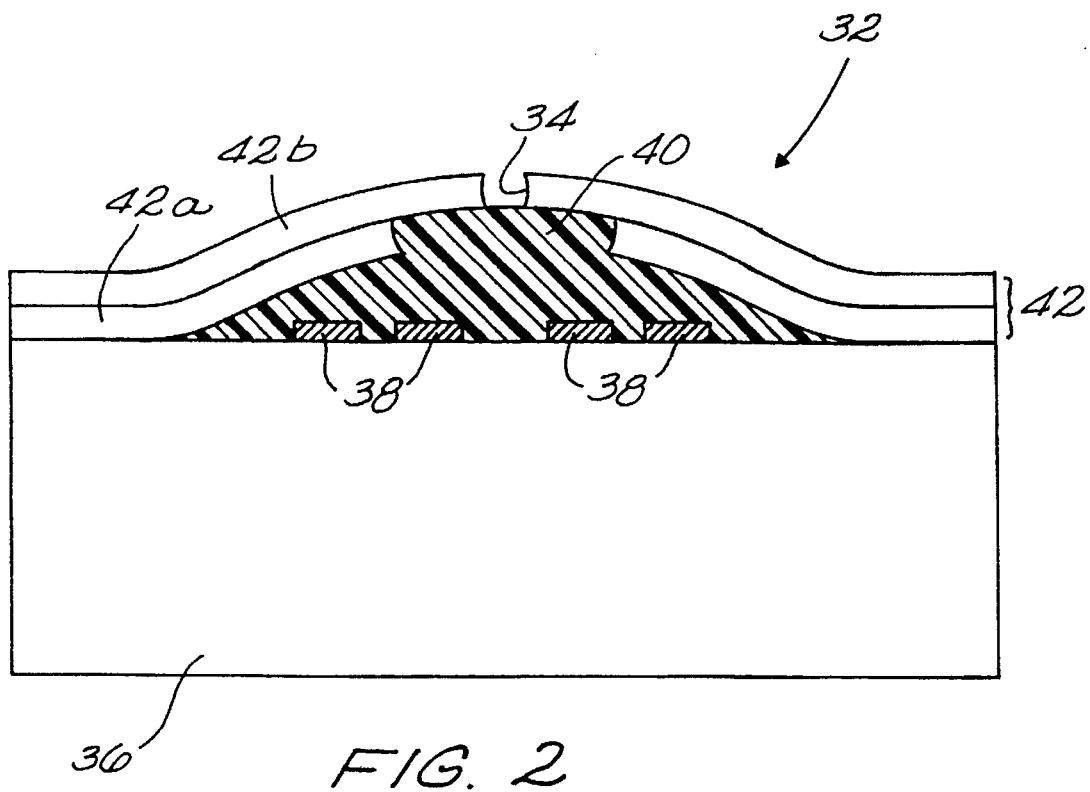
FIG. 2 is a cross-sectional view of a 4-turn write element which has a gap at the top surface of the element, employing a two-stage process for the second pole piece (P2)

The magnetic head design of the present invention is shown in FIG. 2, which is a cross-sectional view of a 4-turn write element 32 which has a gap 34 at the top surface of the element. The substrate 36 comprises a Ni-Zn ferrite upon which a highly electrically conducting metal, preferably gold, pattern coil 38 is deposited. The substrate 36 comprises the first pole piece, or poletip, and is often referred to as "P1".

Over the Au coils 38, several layers of photoresist (shown as a single layer 40) and a two-stage P2 (second poletip) layer 42 are deposited. The two-stage P2 layer 42 comprises two layers, a first, lower layer 42a formed on top of the photoresist 40, and a second, upper layer 42b formed on top of the first layer. The composition of the two layers 42a, 42b is a high saturation flux density magnetic layer composite material. Preferably, a nitrided nickel-iron ferrite composition is employed, as described more fully below.

It is the gap 34 in the upper P2 layer 42b that is critical in the operation of the magnetic head design of the present invention. As an example, the gap 34 is in the range of approximately 1 to 3 μm wide. However, smaller gaps, less than 1 μm wide, are under development. The process steps necessary to produce the gap 34 are described below with reference to FIGS. 5a–d.

Figure 3:
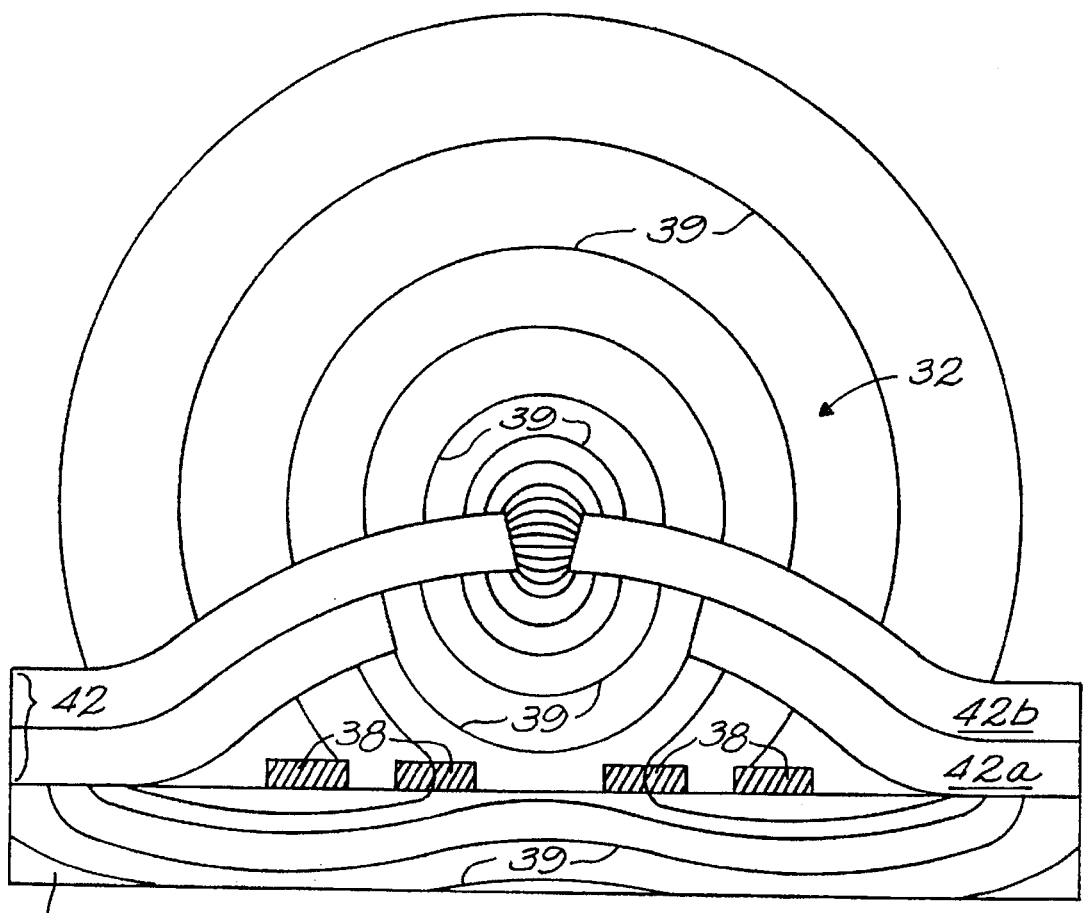
FIG. 3 is a view similar to that of FIG. 2 and illustrating the magnetic field produced from a current in the coils.

FIG. 3 shows the magnetic field produced from a current in the coils 38 and the strong writing field produced at the gap 34. From FIG. 3, it will be observed that the flux density, represented by flux lines 39, is very high in the thin area of the gap 34, and saturation in this area will limit head recording field strength. The thin poletip region, or upper layer, 42b is required to minimize the effect of the gap taper on poletip saturation. It is expected that normal gap taper angles will be about 80° using ion milling techniques. If the P2 material 42 has low wear characteristics, then it is possible to make the poletip region 42b near the gap 34 very thin, which will cancel the effect of the gap taper angle.

A hard nitrided poletip material is used for the P2 process; this material comprises multiple NiFe-N/Fe-N layers; such material has been disclosed elsewhere in IBM Technical Disclosure Bulletin TU891-0080. This P2 material has been wear-tested by deposition on conventional recording heads with no measurable wear.

Figure 4:
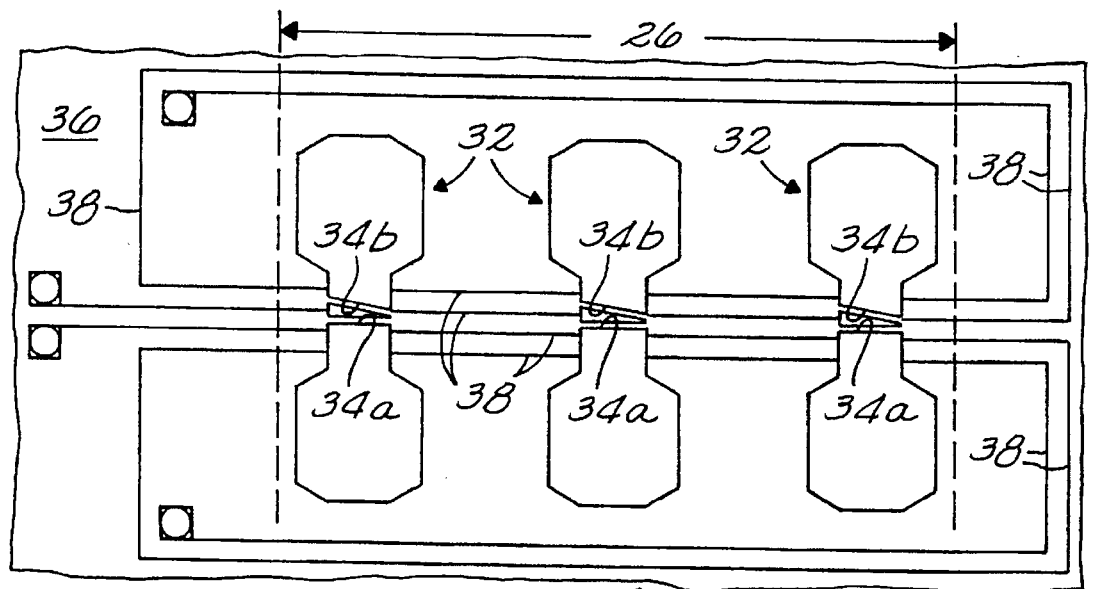
FIG. 4 is a top plan view of three write elements on a single substrate, illstrating both a straight and a slanted gap in the same region.

FIG. 4 is a plan view of three write elements 32 with a straight gap 34a and a slanted gap 34b in the same P2 region. One embodiment of a 4-turn coil 38 pattern is shown, causing the three write elements to write simultaneously. From FIG. 4, it is clear that many more turns could be added. The width of the array of the three devices 32 and the support substrate is slightly wider than the tape 26, to allow simple flying lead connection to the write coils 38.

FIGS. 5a, 5b, 5c and 5d show a simplified view of the process sequence necessary to produce the two-stage P2 42.

Figure 5A:
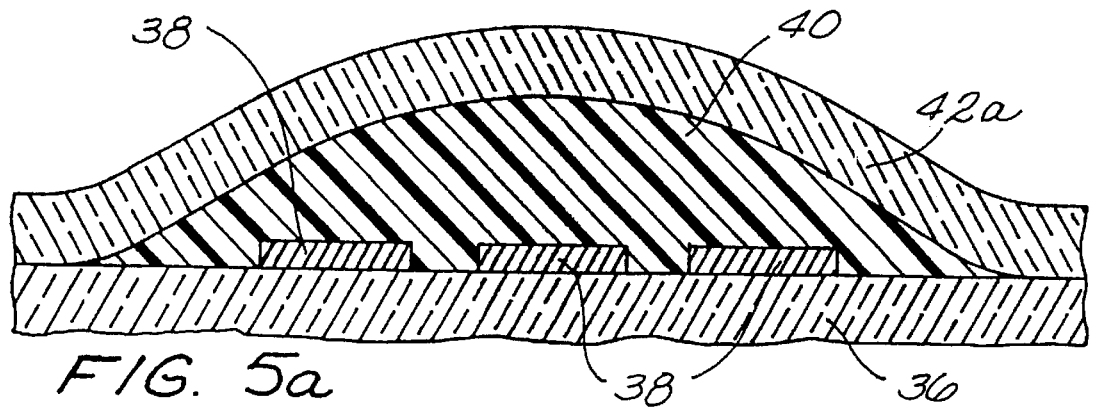
FIGS. 5a, 5b, 5c and 5d are cross-sectional views, depicting the sequence of process steps to form the structure depicted in FIGS. 2 and 4.

The process shown in FIG. 5a involves the deposition of the first layer of P2 material 42a on photoresist 40 with coils 38 beneath the photoresist, on the substrate 36.

Figure 5B:
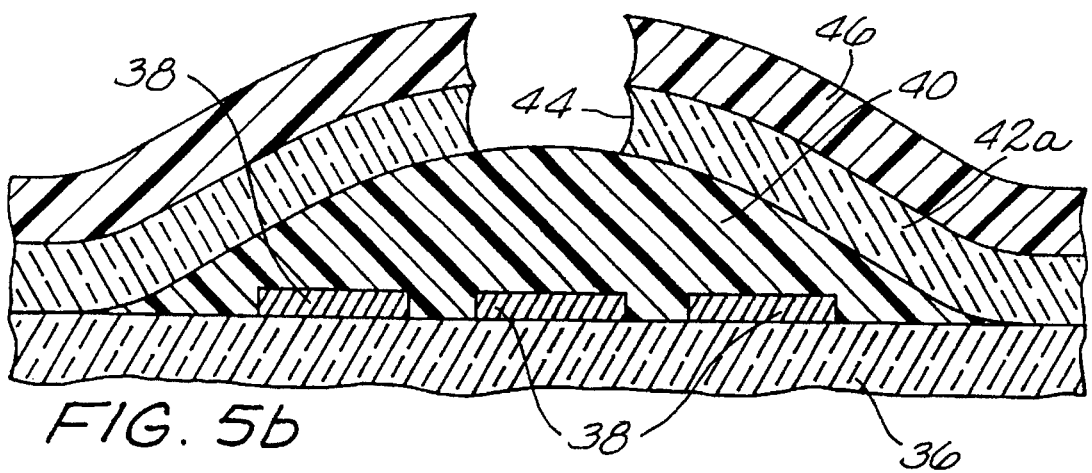

An opening 44 is formed in the first P2 layer 42a as shown in FIG. 5b, using a photoresist layer 46, followed by conventional masking, patterning and wet or dry etching.

Figure 5C:
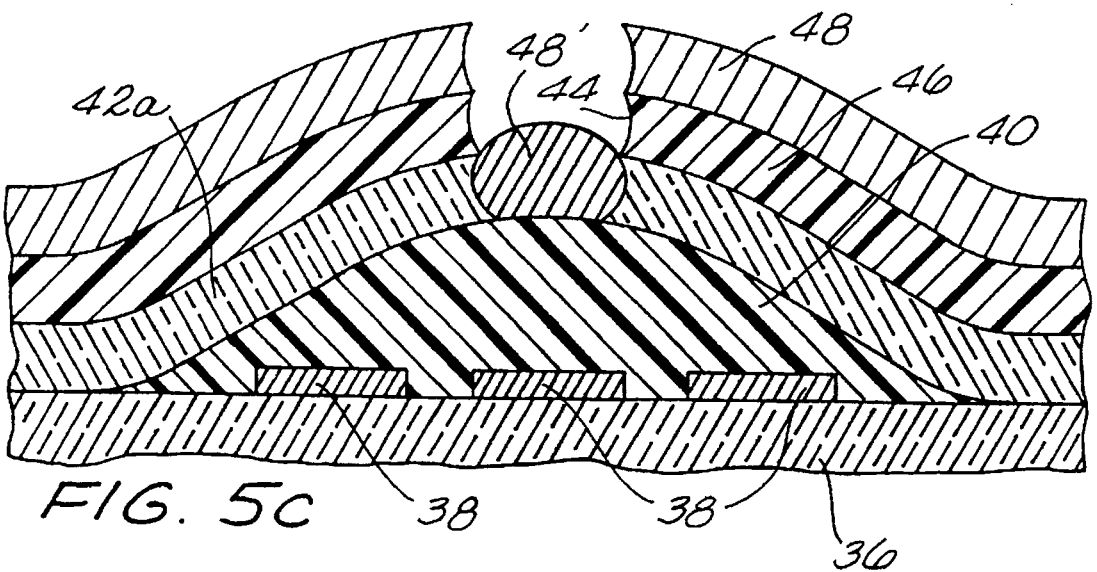

Through the photoresist stencil produced, a metal layer 48, such as gold, is next blanket-deposited, having a thickness of about 1 µm thicker than the P2 layer 42a, as shown in FIG. 5c. Several materials other than gold could be used at this step, since all that is required is a material that will afford a relatively thick liftoff As seen in FIG. 5c, a metal plug 48' is deposited on top of the exposed portion of the photoresist layer 40.

Figure 5D:
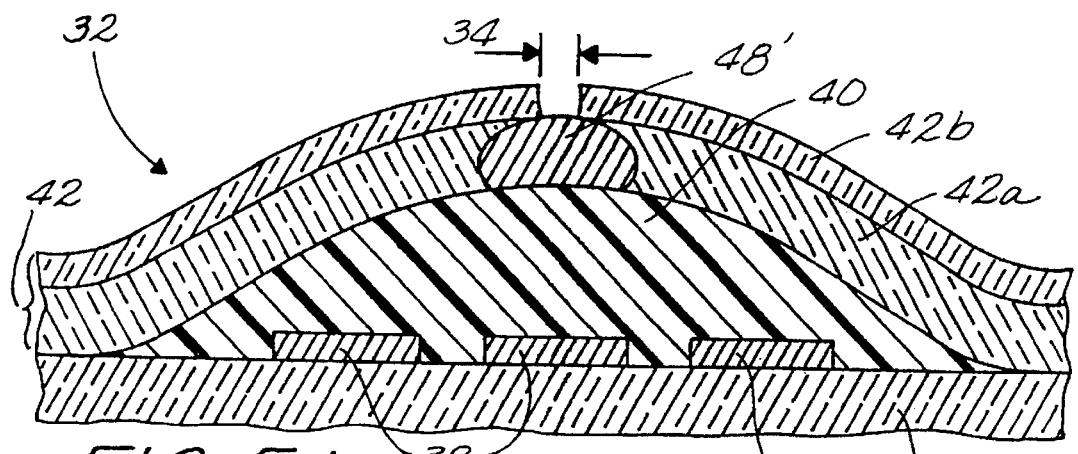

Next; the photoresist layer 46 is stripped, removing the metal layer 48, but leaving the metal plug 48' in the opening 44 on top of the photoresist layer 40. The second P2 layer 42b is then deposited on the first P2 layer 42a. The second P2 layer 42b is thinner than the first P2 layer 42a. Specifically, the first P2 layer 42a ranges from about 2 to 5 µm in thickness, while the second P2 layer 42b ranges from about 0.5 to 2 µm in thickness. The gap 34 is then formed by ion-milling through the second P2 layer 42b; the resulting structure is shown in FIG. 5d. If, following lift-off, the thin electrically conductive layer 48' is left in the opening 44 and not removed, then a metallic gap spacer is formed that has high eddy current loss and improves head efficiency at higher frequencies.

FIG. 3 flows a low frequency magnetic model of the structure with the metal plug 48' and the photoresist layer 40 removed, leaving an unsupported P2 42 which is electrically insulated from the coils 38 by air.

It will be appreciated by those skilled in this art that the particular process steps, such as deposition of photoresist layers and metal layers, patterning of photoresist and lift-off, and the like are all known process steps. However, the sequence of steps resulting in the formation of write elements 32 is considered novel.

A magnetic study of the geometry formed by the process depicted in FIGS. 5a–d shows that with 250 mA in the coils 38, it is possible to develop fields greater than 3,000 Oe at 0.25 µm spacing with the two-stage P2 process of the present invention. The P2 material 42a, 42b used must have a saturation moment ($B_s$) which is 15K gauss or greater. The NiFe-N/Fe-N material discussed above meets this criteria and also has very good wear properties. In fact, experimental results show almost no film wear when the film is used in direct contact with magnetic recording tape as discussed in the present invention. With the conductive gap spacer 48', it is expected that even higher recording field strength at higher frequencies will be obtained.

Figure 6:
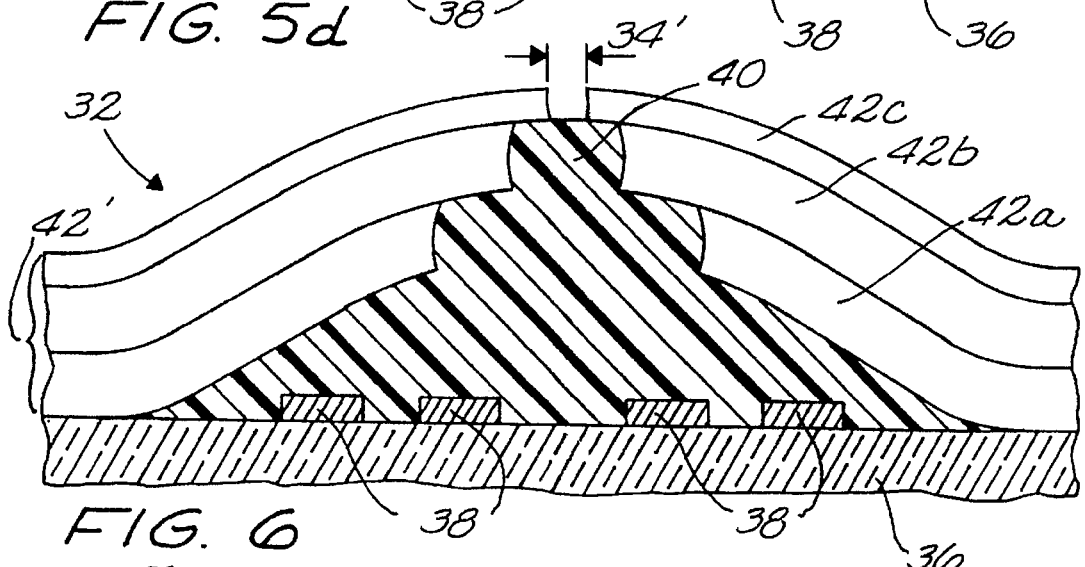
FIG. 6 is a view similar to that of FIG. 2, but employing a three-stage P2 process.

To record on metal particle (MP) tape media, specifically, iron particles, it is desirable to have field of>4,000 Oe at a 0.25 µm spacing. Therefore, a three-stage P2 process has been developed in accordance with the present invention, with the resulting structure shown in FIG. 6. The thinnest and final P2 layer is designated 42c. FIG. 6 depicts a completed write dement 32, employing a three-stage P2 42', comprising first P2 layer 42a, second P2 layer 42b, and third P2 layer 42c. The three-stage P2 42' enables formation of narrow gaps 34', of sub-micrometer dimensions. Formation of the three-stage P2 42' is a simple extension of the two-stage P2 process sequence described above with reference to FIGS. 5a–d is followed, with the modification that the third P2 layer 42c is formed in the same fashion as the second P2 layer 42b.

Figure 7:
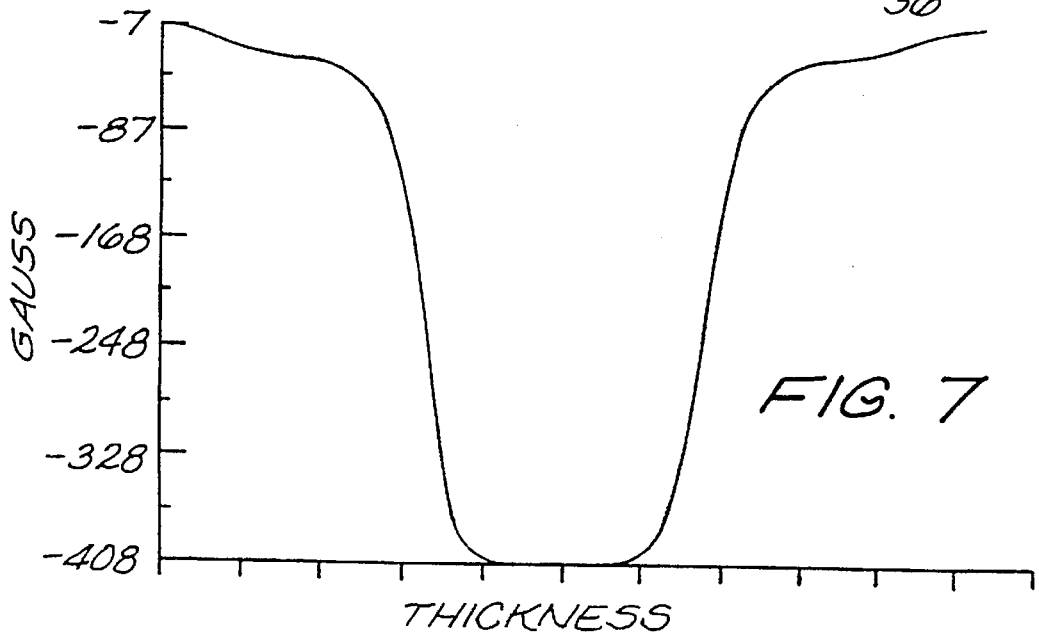
FIG. 7, on coordinates of gap field (in Gauss) and distance across poletips (in μm), is a plot showing the field that magnetic tape, separated by a distance of 10 μinches from the write head of the invention, would experience with the elements energized.

The gap length shown in this three-stage P2 process is 2 µm and the gap taper is 78 µm, with a final thickness (P2 layer 42c) of 1 µm. The recording field at a 0.25 µm spacing is shown in FIG. 7, where>4,000 Oe is shown without poletip saturation. It is expected that the spacing will be less than 0.25 µm, achieving the 4,000 Oe field at less than 250 mA in the write coils 38. As mentioned earlier, the performance at higher frequencies will be enhanced with the Au gap plug 48'. In the three-stage P2 configuration, the thickness of the first P2 layer 42a ranges from about 3 to 6 µm, the thickness of the second P2 layer 42b ranges from about 1 to 3 µm, and the thickness of the third P2 layer 42c ranges from about 0.5 to 1.5 µm.

The recording head 32 of the present invention can be made with less than a 1 mm thickness and a length slightly wider than the tape width to be recorded. For example, with an 8 mm tape 40, a 10 mm long head 32 with a width of 1.5 mm including kerf can be made. On a 5-inch wafer, over 800 of these heads 32 can be fabricated. The heads 32 are then mounted on a simple mechanical substrate 50 and high tension is used to obtain intimate head-to-tape contact as shown in FIG. 8. Due to the relative scale of FIG. 8, the coils 38 and gap 34 are not shown in FIG. 8.

Multiple gaps, such as gaps 34a, 34b shown in FIG. 4, are easily fabricated by appropriate patterning and etching during formation of the gaps. Although the process sequence in FIGS. 5a–d depict formation of a single gap 34, it will be readily apparent to those skilled in this art that multiple gaps may also be formed.

A multiple gap write head 32 can be used to generate both calibration and servo patterns. FIGS. 9, 9a, and 9b depict one pattern 52 of magnetic regions 54 that can be generated, using a write head as schematically illustrated in FIG. 9b. Starting with DC-erased media 26, the head 32 is then passed over the media with no current flowing through the coils 38. Whenever a decision is made to write the pattern 52 on the media 26, a current pulse is sent through the coils 38 from a high-speed current source 56, which in turn is controlled by a pulse generator 58, which sends a pattern of pulses 60 to the high-speed current source. The direction of the current is chosen so that the resulting field reverses the magnetization of the media 26. The entire servo pattern 52 is thus generated by repeatedly reversing the media magnetization in the shape of the head gaps 34.

A second multiple gap write head, also denoted 32, is depicted in FIGS. 10, 10a, and 10b. The coils 38, current source 56, pulse generator 58, and pulse train 60 are omitted from FIG. 10 for clarity; they are identical to the corresponding elements depicted in FIG. 9. The multiple gap write head 32, because of its different configuration as shown in FIG. 10b, writes a different pattern, as evident from FIG. 10a.

The multiple gap write head configurations depicted in FIGS. 9b and 10b are easily formed by conventional photoresist techniques during fabrication of the gap 34 or 34'. Thus, the ability to tailor the write head 32 allows the generation of arbitrarily complex magnetic patterns, limited only by practical constraints.

INDUSTRIAL APPLICABILITY

The arbitrary pattern write head of the invention is expected to find use in servo write heads for magnetic recording.

Thus, there has been disclosed an arbitrary pattern write head and a process for fabricating the same. It will be readily apparent to those skilled in this art that various changes and modifications of an obvious nature may be made, and all such changes and modifications are considered to fall within the scope of the invention, as defined by the appended claims.

What is claimed is:

1. A process for fabricating an arbitrary pattern write head comprising:

(a) providing a substrate comprising a first pole piece magnetic material;

(b) forming on said substrate an electrically conducting film defining a coil pattern; and (c) forming at least two layers of a second pole piece magnetic material over said electrically conducting film and insulated therefrom, thereby defining at least a first deposited layer and a last deposited layer, each layer having an opening defining a gap over said substrate, said last deposited layer having a smaller gap than an underlying layer.

2. The process of claim 1, further comprising forming a plug comprising an electrically conductive material below said last deposited layer and above said electrially conducting film.

3. The process of claim 1 wherein said second pole piece is electrically insulated from said coil pattern by forming a non-magnetic material on said coil pattern prior to forming said at least two layers of second pole piece thereon.

4. The process of claim 1 wherein said second pole piece is electrically insulated from said coil pattern by forming a solid insulating material on said coil pattern prior to forming said at least two layers of second pole piece thereon.

5. The process of claim 4 wherein said insulating material consists essentially of a photoresist material.

6. The process of claim 4 further comprising supporting an electrically conducting material by said insulating material beneath said gap.

7. The process of claim 6 wherein said electrically conducting material consists essentially of gold.

8. The process of claim 6 wherein said first pole piece consists essentially of a nickel-zinc ferrite and wherein said second pole piece consists essentially of a nitrided nickel-iron ferrite.

9. The process of claim 1 wherein said second pole piece is formed from two layers, a first layer provided with a first gap and a second layer formed thereon provided with a second gap of smaller dimension than said first gap.

10. The process of claim 9 wherein said second gap is formed to a dimension of less than about 3 μm.

11. The process of claim 1 wherein said second pole piece is formed from three layers, a first layer provided with a first gap, a second layer formed thereon provided with a second gap of smaller dimension than said first gap, and a third layer formed on said second layer having a third gap of smaller dimension than said second gap.

12. The process of claim 11 wherein said third gap is formed to a dimension of less than about 1 μm.

13. A process for fabricating an arbitrary pattern write head assembly for writing timing-based servo patterns on magnetic storage media, comprising:

(a) providing a substrate comprising a first pole piece consisting essentially of a nickel-zinc ferrite material, said substrate having a major surface;

(b) forming on said major surface of said substrate an electrically conducting film defining a coil pattern; and (c) forming at least two layers of a second pole piece magnetic material over said coil pattern and insulated therefrom, thereby defining at least a first deposited layer and a last deposited layer, each layer having an opening defining a gap over said substrate, said last deposited layer having a smaller gap than an underlying layer, each said layer of said second pole piece comprising a nitrided nickel-iron ferrite material, said second pole piece further electrically insulated from said plurality of electrically conducting windings by a solid insulating material consisting essentially of a photoresist material.

14. The process of claim 13 further comprising supporting a plug of an electrically conducting material by said insulating material beneath said gap.

15. The process of claim 14 wherein said electrically conducting material consists essentially of gold.

16. The process of claim 13 wherein said second pole piece is formed from two layers, a first layer provided with a first gap and a second layer formed thereon provided with a second gap of smaller dimension than said first gap.

17. The process of claim 16 wherein said second gap has a dimension of less than about 3 μm.

18. The process of claim 13 wherein said second pole piece is formed from three layers, a first layer provided with a first gap, a second layer formed thereon provided with a second gap of smaller dimension than said first gap, and a third layer formed on said second layer provided with a third gap of smaller dimension than said second gap.

19. The process of claim 18 wherein said third gap has a dimension of less than about 1 μm.

\* \* \* \* \*

UNITED STATES PATENT AND TRADEMARK OFFICE
CERTIFICATE OF CORRECTION

PATENT NO. : 5,652,015
DATED : July 29, 1997
INVENTOR(S) : Joseph A. Aboaf et al It is certified that error appears in the above-identified patent and that said Letters Patent is hereby corrected as shown below:

```
At column 1, line 4, after "of", insert --copending--.

At column 4, line 12, delete "beating", and insert

At column 5, line 12, after "liftoff", insert --.--;
at line 15, after "Next", delete ";", and insert --,--;
at line 58, delete "dement", and insert --element--.
```

Signed and Sealed this

Nineteenth Day of May, 1998

Attest:

BRUCE LEHMAN

Attesting Officer

Commissioner of Patents and Trademarks